United States Patent Office 2,714,872
Patented Aug. 9, 1955

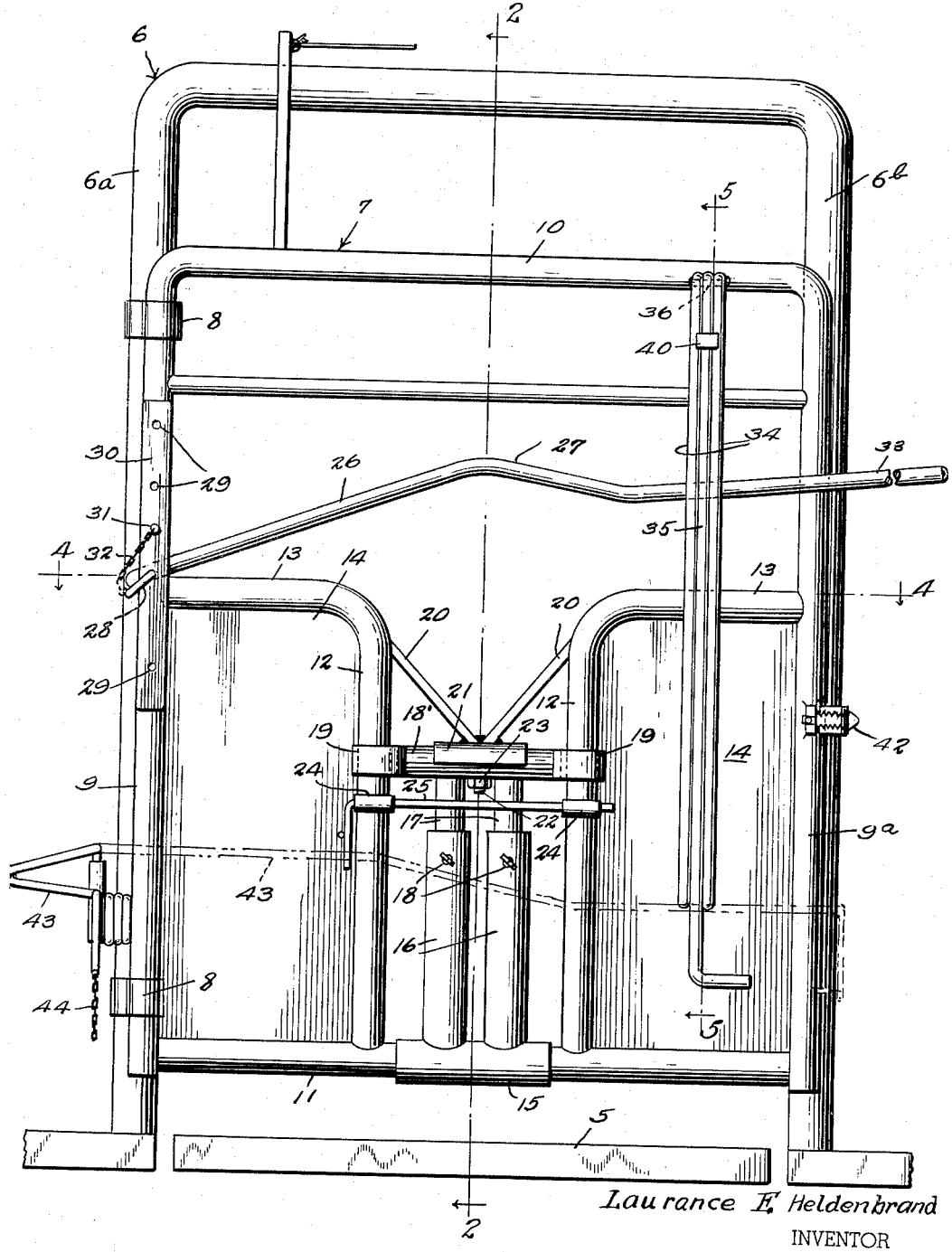

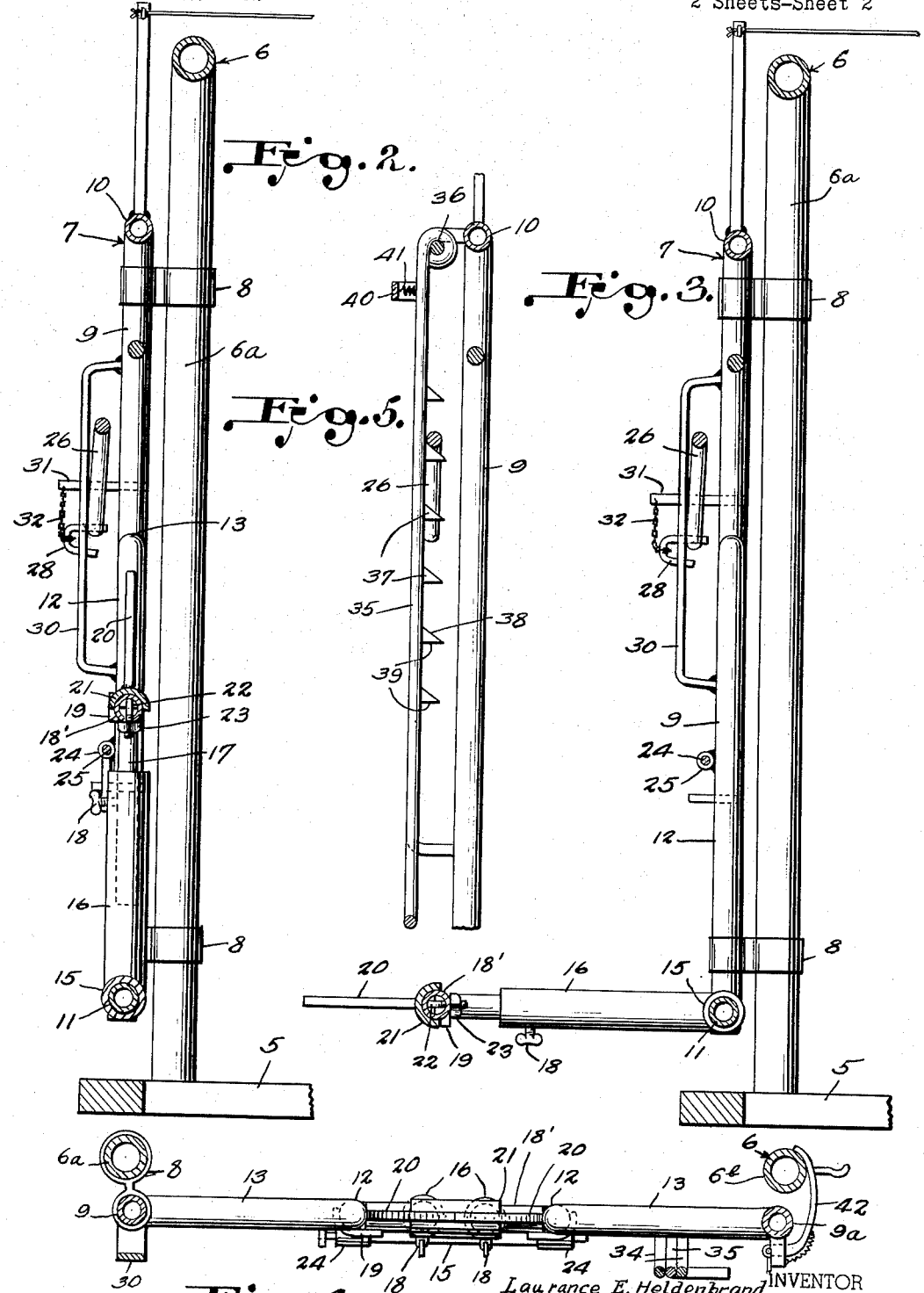

2,714,872

HEAD GATE FOR CATTLE CHUTE

Laurance E. Heldenbrand, Oklahoma City, Okla.

Application December 15, 1952, Serial No. 326,008

6 Claims. (Cl. 119—98)

This invention relates to cattle chute construction, and more particularly to the construction of the head gate thereof.

The primary object of the invention is to provide a cattle chute head gate including a lower neck piece which may be readily adjusted vertically, so that the neck piece may be fitted to the necks of the animals using the head gate, regardless of the height and size of the animals.

Another important object of the invention is to provide a cattle chute head gate including a lower neck piece which is so constructed and arranged that it may be readily swung forwardly out of the way, thereby releasing all pressure on the lower part of the animal's neck when the animal assumes a lying position, the removal of the lower section of the head gate permitting the animal to lower its head to the floor level, without directing uncomfortable pressure to the neck of the animal.

Still another object of the invention is to provide a cattle chute head gate including an upper pivoted neck piece which may be adjusted vertically to comfortably accommodate cattle of various sizes.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings,

Figure 1 is a front elevational view of a head gate constructed in accordance with the invention.

Fig. 2 is a vertical sectional view taken on line 2—2 of Fig. 1.

Fig. 3 is a vertical sectional view similar to Fig. 2 of the drawings, with the exception that the lower neck piece of the head gate has been swung forwardly out of the way of the animal whose head is held within the head gate.

Fig. 4 is a transverse sectional view taken substantially on line 4—4 of Fig. 1.

Fig. 5 is a sectional view taken on line 5—5 of Fig. 1.

Referring to the drawings in detail, the reference character 5 indicates the flooring or base of the cattle chute to which the frame 6 of the head gate is connected. The frame 6 is of inverted U-shaped construction, as clearly shown by Fig. 1 of the drawings, and provides the support for the movable head gate 7 which is connected to the post 6a of the frame 6, as by means of the hinges 8, which hinges permit the movable head gate 7 to swing outwardly away from the post 6b of the frame 6, when it is desired to pass an animal through the chute.

This movable frame 7 embodies a length of heavy tubular material which is bent intermediate its ends to provide vertical posts 9 and 9a connected at their upper ends by means of the horizontal post 10, while the lower ends of the posts 9 and 9a are connected by the horizontal tubular section 11. Thus it will be seen that due to this construction, an exceptionally strong and durable movable head gate section is provided to withstand the severe strains to which it is subjected while an animal's head is held therein.

The movable head gate 7 also includes spaced apart pipes 12 that extend vertically from the horizontal tubular section 11, with the upper ends thereof extended laterally at 13 where they are secured to the posts 9 and 9a, respectively. The spaces between the posts 9 and 9a and the pipes 12 are preferably closed by means of the metallic sheets 14.

Mounted for rotary movement on the horizontal tubular section 11, at a point between the pipes 12, is the tube 15 to which the lower ends of two tubes 16 are connected, the tubes 16 being arranged in parallel spaced relation with respect to each other, as clearly shown by Fig. 1 of the drawings.

These tubes 16 provide supports for the posts 17 that telescope in the tubes 16, the posts 17 being provided with openings which have threads that accommodate the wing bolts 18 that extend through the tubes 16, whereby the posts 17 may be adjusted vertically with respect to the tubes 16.

Secured to the upper ends of the posts 17, is the transversely disposed stop bar 18' that has curved ends 19 curved to fit around the pipes 12, to prevent movement of the stop bar or tubes 16 inwardly beyond the pipes 12.

The reference character 20 indicates arms which are secured to the curved plate 21, the arms 20 diverging towards the pipes 12, where they contact the pipes 12 bracing the stop bar 18' and posts 17 connected therewith.

This curved plate 21 fits over the stop bar 18' and is bolted thereto by means of the bolt 22 which is provided with the nut 23 which secures the curved plate 21 and arms 20 to the transversely disposed stop bar 18. Thus it will be seen that due to this construction, the diverging arms 20 provide the lower portion of the neck piece of the head gate and may be adjusted vertically adapting the device for use with animals of various sizes and heights.

Secured to the pipes 12 are horizontal tubular members 24 which are in horizontal alignment with respect to each other, the tubular members 24 accommodating the rod 25 which provides a stop for the lower movable section of the head gate. When it is desired to provide clearance for an animal whose head is held within the end gate, so that the animal may lie on the floor of the chute, it is only necessary to remove the rod 25 from the horizontal tubular members 24, whereupon the movable section of the head gate may swing outwardly to the position as shown by Fig. 3 of the drawings, leaving ample room for the neck of the animal so that the pressure on the lower part of the animal's neck will be relieved for the comfort of the animal.

Cooperating with the arms 20, is the upper neck piece, which embodies the rod 26 which is constructed to provide the inverted V 27 designed to fit the shape of the neck of the animal to hold the animal's neck and head steady.

As shown, this rod 26 is formed with an opening adjacent to one end thereof, through which the pivot pin 28 extends, the pivot pin 28 also passing through aligning openings 29 in the guard 30, and vertical post 9, to which the guard 30 is secured.

The pivot pin 28 is connected with the pin 31 which also extends through aligning openings of the guard and post 9, by means of the chain 32, thereby holding the pins together so that they will not become lost and will be available for use at all times.

This rod 26, as shown by Fig. 1 of the drawings, is substantially long and has one end thereof extended beyond the side of the head gate, where it provides a handle 33 for effecting operation of the rod 26.

The reference character 34 indicates a pair of spaced bars which are secured to the head gate and extend forwardly therefrom. These spaced bars provide a guide between which the pivoted keeper rod 35 swings, the rod 35 being pivotally connected to the rod 36 at the upper end thereof. This keeper rod 35 is provided with stops 37 that are arranged in vertical spaced relation with respect to each other, the stops 37 having inclined upper surfaces 38 and shoulders 39 directly thereunder. At the upper ends of the spaced bars 34 is the yoke 40 which overlies the rod 35, there being provided the spring 41 held between the yoke and rod 35 for normally urging the rod 35 inwardly against the rod 26. Thus it will be seen that by moving the rod 26 downwardly, the rod 35 will be swung outwardly and snapped into position directly over the upper edge of the rod 26, to hold the rod 26 in its positions of vertical adjustment after it has been clamped around the neck of the animal whose head is positioned within the head gate.

Secured to the post 9a at the opposite side of the movable head gate, is the spring latch 42 which is adapted to snap over the post 6b of the chute frame, as clearly shown by the drawing, to normally hold the pivoted section of the head gate in its active position against the end of the chute frame.

The V-type nose piece indicated by the reference character 43 is pivotally mounted on one of the posts 9 of the movable frame, and is adapted to swing across the front of the head gate to grip the nose of the animal held within the head gate, the chain 44 providing means for securing the nose piece in position.

Having thus described the invention, what is claimed is:

1. In a cattle chute, a main frame, a head gate pivotally connected to said main frame, adapted to partially close one end of said main frame, said head gate comprising spaced vertical pipes between which an animal's neck is held and a lower horizontal tubular section, a vertically adjustable neck piece mounted on said horizontal tubular section for vertical swinging movement between said vertical pipes substantially closing the space between said vertical pipes, a vertical sliding neck piece section mounted on said vertically adjustable neck piece adapted to engage the neck of an animal, and an upper neck piece pivotally mounted on the head gate above said vertically adjustable neck piece cooperating with the vertically adjustable neck piece in gripping the neck of the animal held in the chute.

2. In a cattle chute, a main frame, a vertically swinging head gate pivotally connected to said main frame closing one end thereof, a lower horizontal pipe forming a part of the head gate, spaced vertical pipes rising from the lower horizontal pipe, providing a neck space within the head gate and within which an animal's neck is held, a vertically swinging neck piece mounted on the lower horizontal pipe, movable to a vertical position between the vertical pipes engageable with the lower portion of the neck of such animal held in the chute, and means for securing said neck piece in its vertical position.

3. In a cattle chute, a main frame, a head gate hingedly connected to said main frame, a lower horizontal pipe forming a part of the head gate, spaced vertical pipes rising from the lower horizontal pipe at a point adjacent to the center of said lower horizontal pipe, providing a neck space within which an animal's neck is held, a vertically swinging member mounted on said lower horizontal pipe, comprising an extensible neck engaging section, and V-shaped arms extending upwardly from the extensible section of the vertically swinging member, adapted to engage the neck of an animal using the chute, and said vertically swinging member adapted to swing downwardly independently or simultaneously with said gate head.

4. In a cattle chute, a main frame, a head gate connected to said main frame, a lower horizontal pipe forming a part of the head gate, spaced vertical pipes rising from the lower horizontal pipe providing a neck space within which an animal's neck is held, a vertically swinging member mounted between the vertical pipes, said vertical swinging member comprising spaced pipes, posts slidable within the spaced pipes of said vertically swinging member, a horizontal stop bar connected to the upper ends of the posts adapted to engage the said vertical pipes of the head gate holding the vertically swinging member against movement in one direction, means for holding the vertically swinging member against movement in the opposite direction, and an upper neck bar cooperating with said vertically swinging member in gripping the neck of an animal using the chute.

5. In a cattle chute, a main frame, a head gate connected to said main frame for horizontal swinging movement, a lower horizontal pipe forming a part of the head gate, spaced vertical pipes rising from the lower horizontal pipe providing a neck space within which an animal's neck is held, while the animal is in a lying position, a vertically swinging neck piece mounted at the base of the neck space normally supported in a vertical position closing the major portion of the neck space and supporting the neck of an animal while in a standing position, and said vertically swinging neck piece being movable to a position clear of said neck space.

6. In a cattle chute, a main frame, a head gate connected to said main frame for horizontal swinging movement, vertical pipes formed on the head gate, said vertical pipes being arranged in spaced relation with respect to each other providing a neck space in which an animal's neck is held, a vertically swinging neck piece movable into said neck space adapted to contact the neck of an animal using the chute, and an upper bar cooperating with the vertically swinging neck piece in holding an animal within the chute.

References Cited in the file of this patent

UNITED STATES PATENTS

| Number | Name | Date |
|---|---|---|
| 1,186,828 | Pfander | June 13, 1916 |
| 1,487,935 | Gray | Mar. 25, 1924 |
| 1,560,888 | Watt | Nov. 10, 1925 |
| 2,136,008 | Gregory | Nov. 8, 1938 |
| 2,266,991 | Richins | Dec. 23, 1941 |